United States Patent
Sadler et al.

(10) Patent No.: US 10,735,963 B1
(45) Date of Patent: Aug. 4, 2020

(54) WIRELESS COMMUNICATION METHOD FOR SECURE SIDE-CHANNEL SIGNALING AND AUTHENTICATION AT THE PHYSICAL LAYER

(71) Applicant: The United States of America, as represented by the Department of the Army, U.S. Army CCDC Army Research Laboratory, Adelphi, MD (US)

(72) Inventors: Brian Sadler, Laurel, MD (US); Paul Yu, Laurel, MD (US); Ricky Blum, Coopersburg, PA (US); Jake Perazzone, Bethlehem, PA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/810,157

(22) Filed: Mar. 5, 2020

(51) Int. Cl.
*H04W 12/04* (2009.01)
*H04W 12/06* (2009.01)
*H04L 29/06* (2006.01)
*H04L 9/32* (2006.01)

(52) U.S. Cl.
CPC ........... *H04W 12/06* (2013.01); *H04L 9/3271* (2013.01); *H04L 63/0428* (2013.01); *H04L 63/08* (2013.01); *H04W 12/04* (2013.01); *H04L 2209/80* (2013.01)

(58) Field of Classification Search
CPC ..................................................... H04W 12/06
See application file for complete search history.

(56) References Cited

U.S. PATENT DOCUMENTS

| 2011/0107093 A1* | 5/2011 | Muller | H04L 63/08 |
| | | | 713/168 |
| 2012/0140935 A1* | 6/2012 | Kruglick | H04L 65/1083 |
| | | | 381/56 |
| 2018/0137329 A1* | 5/2018 | Kim | G06K 9/00013 |

* cited by examiner

*Primary Examiner* — Michael T Vu
(74) *Attorney, Agent, or Firm* — Alan I. Kalb

(57) ABSTRACT

A method for wireless communication using a service side-channel signaling and authentication at the physical level. This method comprising the steps of creating at least one transmitting node and one receiving node within a wireless communication channel. Then choosing primary message and a secondary message and generating a valid transmission tag. Then superimposing the valid transmission tag and creating a set of secret codebooks in order to form a side-channel. Then applying key equivocation metric to measure key information leakage to an eavesdropper. Then transmitting said primary message and said secondary message. Then a receiver receiving said primary and said secondary messages detecting fingerprint estimating data combining a key set with the estimated data sending data and key set to a matrix to generate a secret codebook searching for valid tags authenticating and recovering side information.

8 Claims, 7 Drawing Sheets

WIRELESS COMMUNICATION METHOD FOR SECURE SIDE-CHANNEL SIGNALING AND AUTHENTICATION AT THE PHYSICAL LAYER

GOVERNMENT INTEREST

The embodiments herein may be manufactured, used, and/or licensed by or for the United States Government without the payment of royalties thereon.

CROSS-REFERENCE TO RELATED APPLICATION(S)

This application claims the benefit of U.S. Provisional Patent Application No. 62/814,317 filed on Mar. 6, 2019, which is incorporated herein by reference in its entirety.

BACKGROUND

Technical Field

The embodiments herein generally relate to encryption systems, and more particularly to an improvement in fingerprint embedding authorization.

Description of the Related Art

In conventional digital communications systems, a sender uses a message signal to transmit message symbols to a receiver. In conventional digital communications systems, a sender uses a message signal to transmit message symbols to a receiver. The sender and receiver agree upon a transmission scheme such that the mapping between signals and symbols are unique and known by both parties. In order to satisfy requirements for stealth, robustness, and security of a communication system, authentication, integrity, and secrecy of the signal transmission via a transmitting media is to be provided. For an authentication system, uniqueness and non-reproducibility of the identification signal are of the utmost importance.

Research in authentication techniques have focused mostly above the Physical Layer (PHY) of the Open System Interconnection (OSI) model underlying the operation of the network system. As is known to those skilled in the art, the OSI model is an abstract description for layered communications and computer network protocol design. The OSI divides network architecture into seven layers, out of which the Physical Layer (PHY) is the bottom layer. The function of the PHY is to define the electrical and physical specifications of a device, and, in particular, to define the relationship between the device and a physical medium, including performing encoding and signaling functions that transform data from bits residing within a device into signals to be sent over the net-2 work. The PHY also defines specifications as to data transmission and reception at the device.

There are two paradigms conventionally used in communication systems for adding authentication: multiplexing or 5 embedding. Examples of multiplexed authentication may be represented by message authentication codes or authentication protocols that require a series of message devoted to authentication. An overview of these methods may be found in G. J. Simmons, "A survey of information authentication", 10 Proceedings of the IEEE, Volume 76, Issue 5, May 1988, pp. 603-620; as well as in Chapters 9 and 10 of A. J. enezes, P. C. van Oorschot, and S. A. Vanstone, "Handbook of Applied Cryptography", 5th printing, CRC Press, 2001. The advantage of these methods is that the authentication is received with the 15 same quality as the data. However, data throughput is penalized since some of the bits carry authentication instead of data.

In 1972, T. Cover, "Broadcast channels", IEEE Transactions on Information Theory, Volume 18, Issue 1, Jan. 20, 1972, pp. 2-14 analyzed broadcast channels and demonstrated that high joint rates of transmissions are best achieved with simultaneous, as opposed to time-multiplexed, transmissions. Digital watermarking follows the paradigm of embedded signaling by modifying the data in a controlled manner 25 that provides additional information to the receiver. Authentication may be transmitted in this manner as presented in C. Fei, D. Kundur, and R. H. Kwong, "Analysis and Design of Secure Watermark-based Authentication Systems", IEEE Transactions on Information Forensics and Security, Volume 30 1, No. 1, March 2006, pp. 43-55; as well as in L. M. Marvel, C. G. Boncelet, and C. T. Retter, "Spread Spectrum Image Steganography", IEEE Transactions on Image Processing, Volume 8, Issue 8, August 1999, pp. 1075-1083. The embedded signaling for adding the authentication has proven to 35 provide stealthy authentication. However, as opposed to the multiplexing approach, embedding of additional information degrades the data quality (I. J. Cox, M. L. Miller, and A. L. McKellips, "Watermarking as Communications with Side Information", Proceedings of the IEEE, Volume 87, Issue 7, 40 Jul. 1999, pp. 1127-1141). Much of the research in digital watermarking has focused on watermarking multimedia data and minimizing the distortion at the receiver in terms of human perception.

At the Physical Layer, work has been done in authenticating the sender and receiver based on prior coordination or secret sharing, where the sender is authenticated if the receiver can successfully demodulate and decode the transmission. Spread spectrum techniques, such as direct sequence and frequency hopping, may be viewed as examples of physical layer authentication systems (J. G. Proakis, Digital Communications, 4th ed. New York: McGraw-Hill, 29000, Chapters 5, 13). While these techniques are covert and provide robustness to interference, they achieve this at the cost of bandwidth expansion. Additionally, if it is desired to add 55 authentication to a system in a stealthy way so that users unaware of the authentication continue to communicate without modifications to hardware or protocol, the technique does not serve this purpose well, since only authenticated parties with knowledge of the secret are allowed to participate in communications. The need for such stealth arises, for example, when authentication is piggybacked onto an existing system.

The idea of transparently adding information at the physical layer has been studied for some specific cases. S. H.65 Supangkat, T. Eric, and A. S. Pamuji, "A public key signature for authentication in telephone", APCCAS 2002, Volume 2, pp. 495-498 proposed one such authentication scheme for telephony where an encrypted hash of the conversation is added back into the signal. Similarly, J. E. Kleider, S. Gifford, S. Chuprum, and B. Fette, "Radio Frequency Watermarking for OFDM Wireless Networks", ICASSP 2004, Volume 5, p. 397-400 proposed a scheme where a low-power watermark 5 signal is added to the data signal with spread spectrum techniques. X. Wang, Y. Wu, and B. Caron, "Transmitter identification using embedded pseudo random sequences", IEEE Transactions on Broadcasting, Volume 50, Issue 3, September 2004, pp. 244-252 proposed a scheme for broadcast television where each transmitter adds a unique low-power signal to its transmission in order to prove its identity to the receivers.

The transparent transmission of data may also be built by using multi-resolution transmission, where varying levels of protection are guaranteed for multiple data streams as presented in L. F. Wei, "Coded modulation with unequal error protection", IEEE Transactions on Communications, Volume 41, Issue 10, October 1993, pp. 1439-1449; P. K. Vitthaladevuni and M. S. Alouini, "Exact BER computations of generalized hierarchical PSK constellations:", IEEE Transactions on Communications, Volume 51, Issue 12, December 2003, pp. 2030-2037; and M. Morimoto, M. Okada, and S. Komaki, Fourth IEEE International Conference on Universal Personal Communications, November 1995, pp. 769-772. With this scheme, data symbols are sent at high rate while the authentication is sent at a lower rate. Multi-resolution (also known as asymmetric or non-uniform) constellations provide important data signal points to be far apart while less important signal points are close together.

Authentication at the physical layer may be viewed as a special use of pilot symbols inserted in the transmitted signal, since the authentication signal is verified and therefore known at the receiver. However, a subtle difference arises since the authentication signal may or may not be present in the received signal. Pilot symbols are either time division multiplexed (TDM) or superimposed (SI) with the transmitted messages. M. Dong, L. Tong, B. M. Sadler, "Optimal insertion of pilot symbols for transmission over time-varying flat fading channels" IEEE Transactions on Signal Processing, Volume 52, Issue 5, May 2004, pp. 1403-1418 showed that SI schemes may outperform TDM schemes when the transmission channel becomes sufficiently time varying. For a packet based multi-carrier system, J. E. Kleider, G. Maalouli, S. Gifford, S. Chuprun, "Preamble and embedded synchronization for RF carrier frequency-hopped OFDM", IEEE Journal on Selected Areas in Communications, Volume 23, Issue 5, May 2005, pp. 920-931 suggested that SI pilot symbols may be used for channel acquisition while incurring only a 1 dB penalty when compared to a TDM training scheme.

Although a vast amount of research has been performed in the field of authenticated communication there still is a need to improve stealth, robustness and security of authentication schemes by hiding the authentication in the physical waveform while maintaining high levels of robustness and security.

SUMMARY

The communication model of the present invention consists of a legitimate transmitter/receiver pair and a single computationally unlimited adversary. A legitimate pair is formed when two parties agree upon a secret key that was chosen uniformly at random from the set of all possible keys. Conversely, the adversary is initially ignorant of the key that is shared between the legitimate users. The transmitter's goal is to send two messages to the receiver in which the primary message is high-rate, but not secret, while the secondary message is low-rate and secret. In addition to the two messages, the transmitter also wishes to provide the receiver with the ability to authenticate their transmissions. Proof of authenticity is provided through the secondary message whose corresponding transmitted codeword is drawn from a secret codebook dictated by the primary message and shared key. If the noisy observation of the secondary message is close enough to a codeword in the secret codebook, the secondary message is decoded to that codeword and the entire transmission is deemed authentic. In this case, closeness" is measured by Neyman-Pearson style detection. Since the adversary does not have access to the secret key, they cannot reproduce the secret codebook and thus are unable to encode or decode the secondary messages required to produce an authentic transmission. The primary message, on the other hand, can be encoded using any modern coding technique and is not the focus of this invention.

The primary and secondary messages are sent simultaneously using the hierarchical modulation technique utilized in U.S. Pat. No. 9,161,214 B2 "Wireless Communication Method and System for Trans-mission Authentication at the Physical Layer" where the power allocated to the two messages are controlled by scalar parameters.

BRIEF DESCRIPTION OF THE DRAWINGS

The embodiments herein will be better understood from the following detailed description with reference to the drawings, in which.

DETAILED DESCRIPTION

Figure 1:
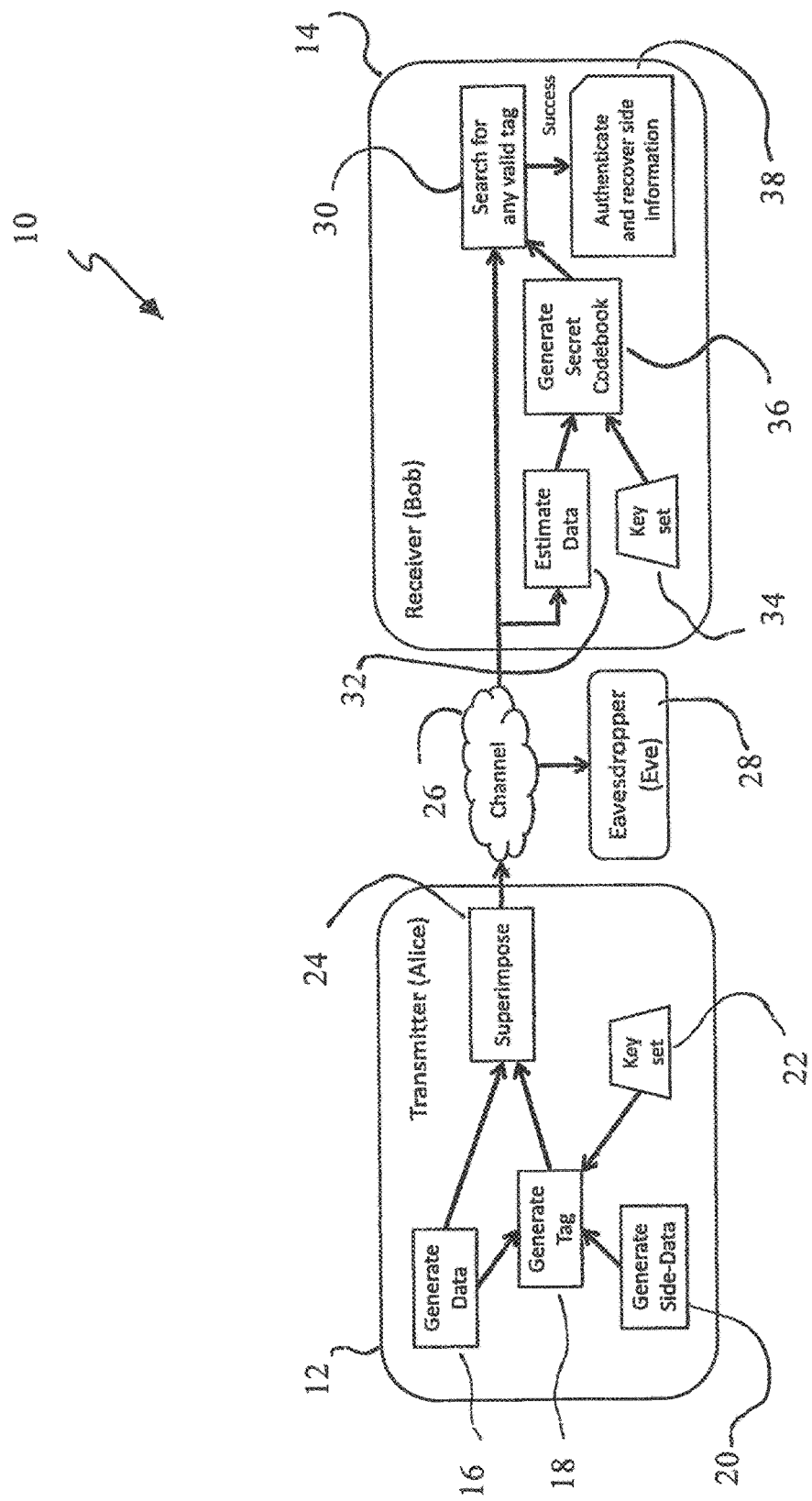
FIG. 1 is a schematic diagram representing the communication system with the authentication scheme of the present invention.

Referring to FIG. 1 a system diagram of the multi-key physical layer fingerprinting framework (10) in accordance with the present invention is provided. A transmitter (12) and a receiver (14) are provided. Within the transmitter (12) we find means for generating data (16), a tag generator (18) a means for generating side-data (20) and a key set (22). All of these elements are combined with a method to superimpose (24) the information in a side-channel communication. The communication is transmitted by the transmitter (12) over a channel (26) where it may be exposed to an eavesdropper (eve) (28). The communication is received by the receiver (14) where the data is used to estimated data (32) along with a key set (34) to generate a secret codebook (36). The communication along with the information generated by the secret codebook generation (36) is then used to search for any valid tag (30), finally this information is used to authenticate and recover side information (38).

A legitimate transmitter-receiver paid share the same set of secret keys that are used to enable authentication and transmit additional information over a side-channel. Prior to any public communication, the transmitter and receiver share a K-bit secret master key k that is chosen uniformly at random from K and represents their total shared secret bits. The primary message s is a length L vector of complex-valued iid symbols with zero mean and unit variance. The secondary message is represented by a uniformly chosen integer $m \in \{1, \ldots, N_k\}$ which is used to determine a tag, $t^{xmit}$, obtained from a tag generating function.

$$t^{xmit} = g(s, m, k). \quad \text{(eq. 1)}$$

For a given s and k, the set of all txmit resulting from each m is called the valid tag codebook and is denoted as: $T^{valid} = \{t_i^{valid}\}_{1 \leq i \leq N_k} = \{g(s,k,m)\}_{1 \leq m \leq N_k}$.

We assume that txmit is of similar structure to s, i.e. it is also a length L vector of complex valued iid symbols with zero mean and unit variance, though possibly from a different distribution, or modulation type. This approach simplifies the receiver processing because s and txmit are symbol-synchronous, although more general fingerprint insertion methods are possible. The final symbol output x is given by scaling and summing the message and tag.

$$x = p_s s + p_t t^{xmit} \quad \text{(eq. 2)}$$

The power is allocated between message and tag by $p_s$ and $p_t$, whose values are non-negative real scalars that satisfy $p_s^2 + p_t^1 = 1$. The final output vector, x, is therefore also of unit transmit power.

The procedure for fingerprint embedding from the transmitter is as follows: 1. Choose primary message s and secondary message m. 2. Generate tag txmit using (1). 3. Superimpose tag using (2). 4. Transmit x.

In this invention, two secret codebook construction techniques are considered for the tag generating function (1). In both cases, the construction of the codebook is aided by the use of cryptographic hash functions. The first codebook, called the standard secret codebook, is constructed by first partitioning the master key into $N_k$ smaller keys of identical length$^l$. Denote this partitioned keys by $Kvalid = \{k^{valid}\}_{1 \leq i \leq N}$ is where each sub-key is indexed by a different secondary message.

Then, we assume that $g(s, k, m) = g^1(s, k^{valid})$, where $g^1(\bullet, \bullet)$ is a deterministic function designed so that changes in the input(s) produce what appears to be unrelated (sometimes modeled as statistically independent) outputs. In this approach, $k^{valid}$ is chosen depending on m which facilitates the transfer of information through the side-channel. In practice, cryptographic hash functions are generally accepted as providing a good approximation to the desired $g^1(\bullet, \bullet)$. When dealing with hash functions, the HMAC protocol [1] should be used to securely incorporate the key in order to avoid vulnerabilities such as length extension attacks. The codebook formed from the set of tags corresponding to each m is called the valid codebook for s. It should be noted that the original single key design of the framework in U.S. Pat. No. 9,161,214 B2 is obtained by setting $N_k = 1$ so that there is only one key and thus only one tag in the valid codebook.

The second codebook construction, called the linear secret codebook approach, has similar structure to the first, but the master key is now broken down into log 2 Nk smaller keys, labeled the valid key set. We proceed by calculating a set of basis tags corresponding to each valid key using the same $g^1(\bullet, \bullet)$ as the standard secret codebook approach. (Recall that previously, only a single tag is required to be calculated using the valid key associated with m). The final set of valid tags is then composed of all linear combinations of the basis tags. The final valid linear codebook is of size $N_k$ 1 after omitting the zero tag/codeword since it will be present in every linear codebook for any s and thus is not useful for authentication. Now, $t^{xmit}$ is selected from the codebook based on the secondary message from the range $m \in \{1, \ldots, N_k - 1\}$. The nice properties of $g^1(\bullet, \bullet)$ and the fact that log 2 $N_k \ll L$ guarantees that the codewords produced by the linear combinations will be unique with very high probability [2]. Simple ad hoc fixes can be employed if this is not the case. The secret linear coding scheme does not require any changes to the partitioned codebook procedure described in the preceding sections due to the pairwise independence of codewords. In fact, for a codebook of equal size, the performance between the two schemes will be identical.

Alternate Description of Secret Linear Codebook

The secret linear codebook can be alternatively interpreted as being constructed from a random generator matrix made up of the valid tags of the standard codebook. The transmitter chooses a length $N_k$ binary vector m with the zero vector excluded. The transmitted tag is then:

$$t^{xmit} = m\overline{G} \quad \text{(eq. 3)}$$

$$= \sum_{j=1}^{N_k} m_j t_j^{valid},$$

where $m_j$ is the $j^{th}$ bit of the binary vector m and $t_j^{valid}$ is the $j^{th}$ row of the generator matrix $$\overline{G} = \begin{bmatrix} t_1^{valid} \\ t_2^{valid} \\ \vdots \\ t_{N_k}^{valid} \end{bmatrix}, \quad \text{(eq. 4)}$$

created using (1) for each key in $K^{valid}$. Note that (3) is performed with binary vectors before being modulated to the complex symbols that are superimposed in (2). This formulation is equivalent to linear coding with a generator matrix, in this case $t^{valid}$, whose rows are formed by the set of valid tags T valid. Procedure 2.

| Procedure 2 Secret Linear Codebook (Transmitter) |
| --- |
| 1: Choose primary message s and secondary message m. |
| 2: Use (1) to generate $t_j^{valid}$ for the rows of the generator matrix $\overline{G}$ in (4). |
| 3: Generate tag using (3). |
| 4: Modulate and superimpose tag using (2). |
| 5: Transmit x. |

Channel Model

The additive white Gaussian noise (AWGN) channel is considered for the present invention. The legitimate receiver and the adversary respectively observe $$Y = x + W_b \quad \text{(eq. 5)}$$

$$Z = x + W_e \quad \text{(eq. 6)}$$

where $W_b$ ($W_e$) is a vector of L random complex Gaussian noise samples, each with zero mean and variance $\sigma^2$ ($\sigma^2$).

Receiver Processing

The receiver observes Y through the AWGN channel in (5) and attempts to decode the primary message, determine its authenticity, and recover any side-channel information. It is assumed that tag power is small relative to the message power ($p^2 \gg p^2$), so the message can be decoded by ignoring the presence of the tag, but with a small performance penalty in bit error rate (BER) [3]. The primary message is observed at an SNR of $$\frac{p_s^2}{p_t^2 + \sigma_b^2}.$$

A residual is formed by removing $\hat{s}$, the estimated version of s, from Y to obtain, $$R = \frac{1}{p_t}(Y - p_s\hat{s}) = \hat{t} + \frac{1}{p_t}W_b \qquad \text{(eq. 7)}$$

where $\hat{t}$ represents the unknown tag that was transmitted. The residual can then be tested for the presence of a valid tag by performing a hypothesis test as follows:

$$\begin{cases} H_0 & \text{No valid tag was sent} \\ H_1 & t_1^{valid} \text{ was sent}, m = 1 \\ \vdots \\ H_{N_k} & t_{N_k}^{valid} \text{ was sent}, m = N_k. \end{cases} \qquad \text{(eq. 8)}$$

Essentially, the receiver reconstructs a valid codebook from the obtained $\hat{s}$ and shared k, and then both decodes and determines the authenticity of $\hat{t}$. Note that because the legitimate transmitter and receiver agree upon $K^{valid}$, they also agree upon $T^{valid}$ as long as $s=\hat{s}$. It is assumed in the subsequent analysis that the message is obtained without error. If the message is decoded in error, then authentication is highly likely to fail due to incorrect reconstruction of T valid, the valid codebook.

Deciding $H_0$ indicates that no valid tag was detected in Y. Deciding Hj(>0) indicates that the message is authentic and simultaneously determines the secondary message m. This conveys log 2 $N_k$ bits of information over the side-channel. A test statistic for each valid tag in the codebook is calculated using a bank of $N_k$ matched filters to resolve (8). The test statistic corresponding to $t^{valid}$ is $$Z_i \triangleq Z_i(R) = \Re(R^\dagger t^{valid}_i), \qquad \text{(eq. 9)}$$

for i=1, . . . , $N_k$, where $\Re(\cdot)$ denotes real part of its argument and † is the conjugate transpose. The hypothesis corresponding to the largest test statistic is chosen if it exceeds a threshold, r, that is calculated to limit a, the probability of type I error. The full decision process can be found in Procedure 3 where the threshold design is detailed in the subsequent section.

Fingerprint Detection

The detection threshold r changes for each observation because of the dependency of the codebook, $T^{valid}$, on $\hat{s}$. This section provides the calculations necessary to design the threshold in Procedure 3 that limits the probability of false alarm to a. The false alarm rate allows the legitimate parties to limit the probability that a random tag is wrongly authenticated or that the wrong secondary message is decoded. Decreasing the false alarm rate better protects against impersonation attacks

| Procedure 3 Receiver's Hypothesis Test |
| --- |
| 1: Calculate test statistics $\{z_1, z_2, \ldots, z_{N_k}\}$ |
| 2: Determine i = arg $\max_{1 \leq j \leq N_k} z_j$ |
| 3: Calculate threshold τ |
| 4: if $z_1 > \tau$ then |
| 5:     Decide hypothesis $H_1$ |
| 6: else |
| 7:     Decide hypothesis $H_0$ |
| 8: end if | and side-channel decoding errors, but decreases overall side-channel performance since the stricter test increases the probability of wrongly rejecting an authentic tag.

Because the tags are generated using a cryptographic hash function, the tag/codewords in the codebook are essentially drawn uniformly at random. Thus, we model any particular codebook as an instance of the uniform random variable $T^{valid} = \{T^{valid}_1, \ldots, T^{valid}_{nk}\}$. To reiterate the notation, we then take $t^{valid} = \{t^{valid}_1, \ldots, t^{valid}_{nk}\}$ to denote a particular realization of $T^{valid}$.

Distribution of Test Statistics $\{Z_1, \ldots, Z_{N_k}\}$

We consider the distribution of the test statistics conditioned on each hypothesis. This allows us to calculate the appropriate thresholds to limit the false alarm probability.

The $i^{th}$ test statistic conditioned on hypothesis $H_j$ being true is $$Z_i(R|H_j) = \Re(\hat{t}^\dagger t^{valid}_i | H_j) + \tilde{W}, \qquad \text{(eq. 10)}$$

where $$\tilde{W} = \frac{1}{P_t}\Re(W^\dagger t^{valid}_i)$$

is a zero mean Gaussian random variable with approximate variance$^i$ $$\sigma_{\tilde{w}}^2 = \frac{1}{p_t^2}L\sigma_t^2\sigma_w^2.$$

Thus, $\tilde{W} \sim \mathcal{N}(0, \sigma_{\tilde{w}}^2)$.

We further expand (10), first for $H_0$, and then for Hj(>0). When $H_0$ is true, then an invalid tag was transmitted, i.e., $\hat{t} \in T \setminus t^{valid}$. For security, the number of valid tags comprises a very small subset of T, so that an adversary has a very low chance of picking a valid tag by chance. So, $T \setminus t^{valid}$. With L sufficiently large to apply the Central Limit Theorem, we have that $R(\hat{t}^\dagger t^{valid}$ is normally distributed. Hence, $$Z_i(R | H_0) \cong \Re(\hat{t}^\dagger t^{valid}_i | \hat{t} \in \mathcal{T}) + \tilde{w} \qquad \text{(eq. 10)(eq. 11)}$$

$$\sim \mathcal{N}\left(0, \frac{L}{2}\sigma_t^4 + \sigma_{\tilde{w}}^2\right).$$

When Hj(>0) is true, then it follows simply from (10) that $$Z_i(R | H_{j(>0)}) = \Re(\hat{t}^\dagger t^{valid}_i | \hat{t} = t^{valid}_j) + \tilde{w} \qquad \text{(eq. 13)}$$

$$\sim \mathcal{N}\left(\Re(t^{valid\dagger}_j t^{valid}_i), \sigma_{\tilde{w}}^2\right).$$

To interpret this, let us consider the cases where i=j and i≠j. When i=j, then $$\mathbb{E}\left[\Re\left(T_i^{valid\dagger} T_i^{valid}\right)\right] = L\sigma_t^2$$

because the tag symbols are iid. On the other hand, when $i \neq j$, then $$\mathbb{E}\left[\Re\left(T_{j(\neq i)}^{valid\dagger} T_i^{valid}\right)\right] = 0.$$

2.6 Calculation of Thresholds $\{(\tau_1, \ldots, \tau_{N}k\}$

For each message, $N_k$ thresholds are computed, each chosen to limit the probability of choosing one of the $N_k$ incorrect hypotheses to $\alpha$. More specifically, the thresholds for Hj($>0$) limit side-channel decoding error while the threshold for $H_0$ limits the incorrect acceptance of invalid tags. Conditioned on $H_j$ being true, the thresholds are calculated as $$\tau_i \mid H_{j(\neq i)} = \min_\tau \text{ s.t. } Pr\{Z_i(R \mid H_j) > \tau\} < \alpha. \quad \text{(eq. 14)}$$

for $H_{j(>0)}$ and $$\tau_i \mid H_0 = \min_\tau \text{ s.t. } Pr\{Z_{(N_K)} > \tau\} < \alpha. \quad \text{(eq. 15)}$$

for $H_0$ where $Z(Nk)$ is the maximum test statistic. This is required to account for the fact that the test statistic under $H_0$ is the maximum value produced by a random tag passing through $N_k$ matched filters. In particular, by considering the cases of $H_0$ and Hj($>0$), we have $$\tau_i \mid H_0 = \Phi^{-1}\left(\sqrt[N_k]{1-\alpha}\right)\sqrt{\frac{L}{2}\sigma_t^4 + \sigma_{\tilde{w}}^2} \quad \text{(eq. 17)(eq. 16)}$$

$$\tau_i \mid H_{(j>0)} = \Phi^{-1}(1-\alpha)\sigma_{\tilde{w}} + \Re\left(t_j^{valid\dagger} t_i^{valid}\right)$$

where (16) is due to the maximum order statistic CDF under $H_0$ being $F_Z$ $$\Phi^{N_k}\left(\frac{z}{\sqrt{\frac{L}{2}\sigma_t^4 + \sigma_{\tilde{w}}^2}}\right)$$

where $\Phi(\cdot)$ is the standard normal CDF.

Without any priors as to which hypothesis is more likely, we set the threshold $\tau_i$ conservatively:

$$\tau_i = \max_{j \neq i}\{\tau_i \mid H_j\}. \quad \text{(eq. 18)}$$

$\tau_{ii}$ is excluded from consideration because it does not correspond to a false detection event. One is not restricted to this choice of threshold. For example, one may assign more importance to the null hypothesis to lower the possibility of false authentication.

Authentication Performance

Authentication correctly occurs when 1) the transmitter transmits a message with a valid tag and 2) the receiver is able to detect a valid tag in their observation. That is, it occurs when the transmitter transmits $t^{valid} \in t^{valid}$ and the receiver decides $\hat{t} \in t^{valid}$. However, because of the structure of the secret codebook (or rather, lack thereof) due to the use of cryptographic hash functions, mistaking one valid tag for another using Procedure 3 is extremely unlikely. Therefore, we instead focus on the case where the receiver is able to correctly detect the transmitted tag such that $\hat{t} = t^{valid}$.

Single Realization

We first consider the probability of authentication for a particular set of valid tags $t^{valid} = \{t^{valid}, \ldots, t^{valid}\}$. Without loss of generality, let $H_I$ be true, i.e., $t^{xmit} = t^{valid}$. Then, $$Pr[\text{Decide } H_1 \mid H_1, t^{valid}] = Pr\left[Z_1(R \mid H_1) > \tau_1 \text{ and}\right. \quad \text{(eq. 19)(eq. 20)}$$

$$Z_1(R \mid H_1) =$$

$$\max_{1 \leq i \leq N_k}\{Z_i(R \mid H_1)\} t^{valid}\right]$$

$$= \int_{\tau_1}^{\infty} Pr[Z_2(R \mid H_1) < z, \ldots,$$

$$Z_{N_k}(R \mid H_1) < z \mid t^{valid}]$$

$$p_{Z_1(R|H_1)}(z)dz$$

where pZ1(R|H1) is the probability density of $Z_1$ under hypothesis $H_1$ as given in (13). Note that conditioned on a particular set $t^{valid}$, the test statistics are not independent. This can be easily seen by considering two valid tags that are highly correlated.

Overall

Now, the probability of authentication for a random secret codebook $T^{valid}$ is considered.

$$Pr[\text{Decide } H_1 \mid H_1] = \mathbb{E}_{T^{valid}}[Pr[\text{Decide } H_1 \mid H_1, T^{valid}]]$$

$$= \sum_i Pr[\text{Decide } H_1 \mid H_1, T^{valid} = t_i^{valid}]$$

$$Pr[T^{valid} = t_i^{valid}]$$

Any realization of a secret codebook is modeled as equiprobable. By treating the set of valid tags as random, and conditioning on $H_1$ being true, the following is noted:

$$Z_1 \sim N(L\sigma_t^2, \sigma_{\tilde{w}}^2)$$

$$Z_{i(>1)} \sim N\left(0, \frac{L}{2}\sigma_t^4 + \sigma_{\tilde{w}}^2\right).$$

This follows using the same analysis as presented in Section 2.5.1.

$\{Z_1, \ldots, Z_{N_k}\}$ are independent because they are based on independent tags.

$\tau_1 \mid H_0 = \tau_{1,0}$ is always a constant.

$$\tau_1 \mid H_{j(>1)} \sim N\left(\Phi^{-1}(1-\alpha)\sigma_{\tilde{w}}, \frac{L}{2}\sigma_t^4\right).$$

This follows by applying the Central Limit Theorem to the last term of equation 17

$\{\tau_1|H_{j(=0, 1, \ldots, N_k)}\}$ are independent.

$\{Z_1, \ldots, Z_N k\}$ are independent because they are based on independent tags.

$\tau_1|H_0 = \tau_{1,0}$ is always a constant.

$\tau_1|Hj(>1) \sim N(\Phi^{-1}(1-\alpha)\sigma_w, {}^L\sigma^4)$. This follows by applying the Central Limit Theorem to The acceptance threshold for $Z_1$ is $\tau_1$. Writing out (18) gives $$\tau_1 = \max\{\tau_1|H_0, \tau_1|H_2, \ldots, \tau_1|H_{N_k}\} \quad \text{(eq. 21)}$$

(21) From the above properties of the conditional thresholds, it follows that the density of $\tau_1$ is:

$$f_{\tau_1}(t) = \begin{cases} (N_k-1)f_{\tau_i|H_2}(t)Pr(\tau_1|H_2) < t^{N_k-2} & t > \tau_{1,0} \\ \int_{-\infty}^{\tau_{1,0}} (N_k-1)f_{\tau_i|H_2}(t)Pr(\tau_1|H_2) < t^{N_k-2}dt & t = \tau_{1,0} \\ 0 & t < \tau_{1,0} \end{cases} \quad \text{(eq. 22)}$$

Note that because of the null hypothesis, the $\tau_1$ cannot takes values below $\tau_{1,0}$.

Note that because of the null hypothesis, the $\tau_1$ cannot takes values below $\tau_{1,0}$. The overall probability of authentication (cf. (19)) can now be calculated:

$$Pr[\text{Decide } H_1 | H_1] = \mathbb{E}_{T^{valid}}[Pr[Z_1(R|H_1) >$$

$$Z_2(R|H_1), \ldots, Z_1(R|H_1) >$$

$$\tau_1 | T^{valid}]]$$

$$= \int_{\tau_{1,0}}^{\infty} Pr[Z_2(R|H_1) <$$

$$z | T^{valid}]^{N_k-1} F_{\tau_1}(z) p_{Z_1(R|H_1, T^{valid})}$$

$$(z)dz$$

$$= \int_{\tau_{1,0}}^{\infty} \Phi^{N_k-1}\left(\frac{z}{\sqrt{\frac{L}{2}\sigma_t^4 + \sigma_{\tilde{w}}^2}}\right)$$

$$\phi\left(\frac{z - L\sigma_t^2}{\sigma_{\tilde{w}}}\right) F_{\tau_1}(z)dz. \quad \text{(eq. 23)(eq. 24)}$$

Figure 2:
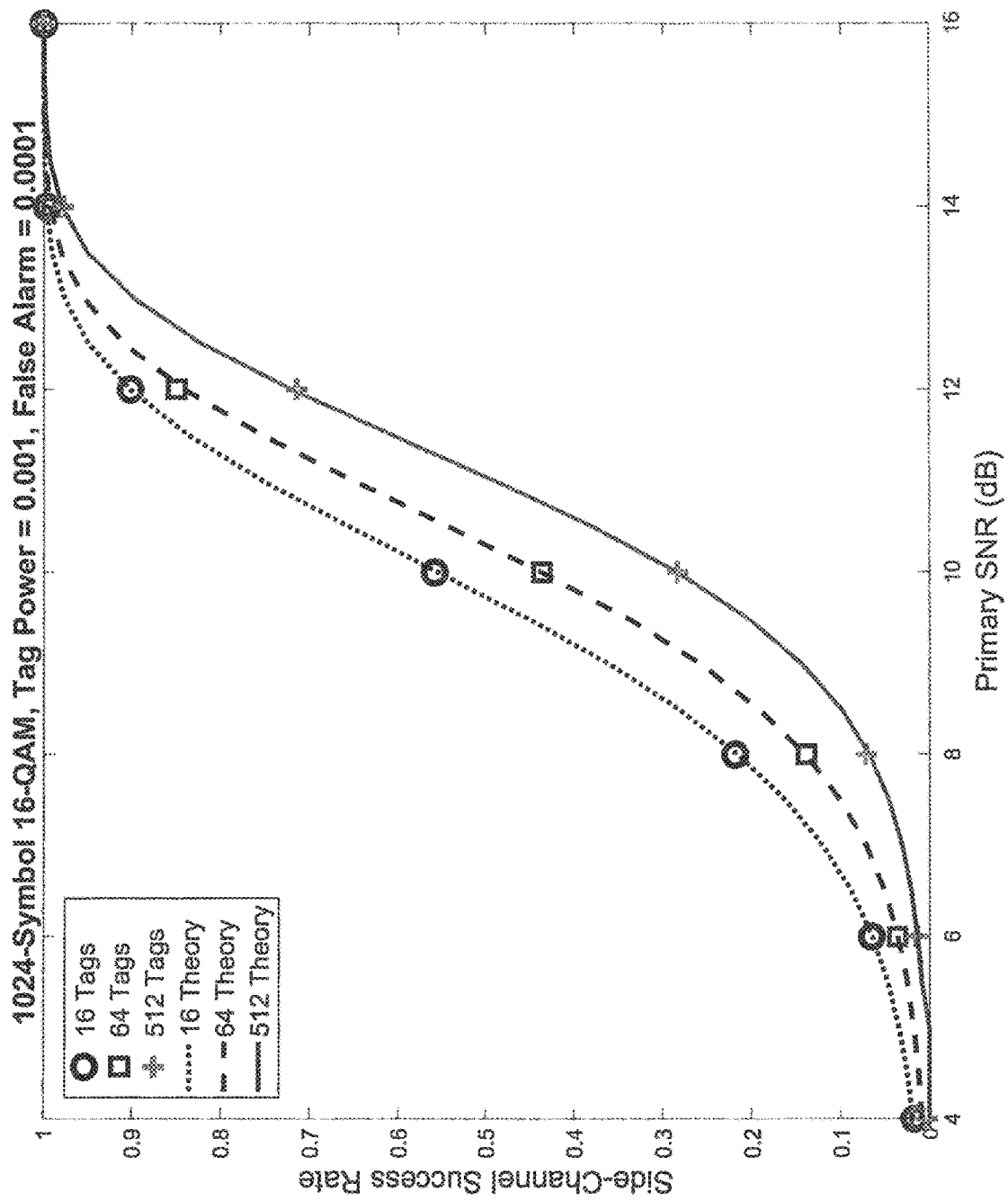
FIG. 2 is a graphical diagram representing an increasing side channel rate.

Referring to FIG. 2, we see increasing the side channel rate, which requires an increase in key set size, requires a larger SNR to achieve the same performance. A linear codebook of equal size performs identically.

3.3 Simulation Results

Monte Carlo simulations verify the mathematical analysis and depict the performance trade-offs of the proposed authentication scheme. We first present a scenario in which all primary messages are assumed to be decoded without error so that the secret codebook is reconstructed properly by the receiver. We then show the effect that message errors have on the authentication and side-channel performance. In this case, we allow error correction capabilities to better depict real world conditions. For all simulations, the message and tag symbols are chosen from a normalized 16QAM constellation and the side-channel communications false alarm rate is set to $\alpha = 10^{-4}$. We vary the codebook size to show the trade-offs between rate and performance. The linear coding scheme achieves the same performance as a partitioned codebook of equal size as explained in Section 2.3, so we do not provide results for both codebook schemes since they are easily compared. For example, a linear code with $N_k=4$ and a partitioned codebook with $N_k=16$ will both have 16 pairwise independent codewords and thus will have the same side-channel performance, but will have differing effects on security which will be presented in Section 4.t FIG. 2 depicts the probability of successfully authenticating and decoding the secondary message when an error-free primary message is observed and a partitioned codebook is used. We use L=1024, 16QAM message and tag modulation, $p^2=0.001$, and $\alpha=10^{-4}$. The master key k has $\kappa=4096$ bits and is partitioned in $N_k$ smaller keys. The decoding and authentication performance is determined by the codebook size, or number of keys; three cases are shown with $N_k=16, 64, 512$ ($N_k=4, 6, 9$ for a linear codebook). Notice that each smaller key will be larger when using the linear codebook scheme rather than the partitioned codebook scheme since fewer $N_k$ partitions are required to achieve the same rate and performance. The advantage of having larger keys will be further explored in Section 4. Increasing the rate of the side-channel requires more codewords, which requires more key choices, which then requires a better SNR to achieve the same performance. The plots show that the theoretical performance of (23) agree with the simulations.

Figure 3:
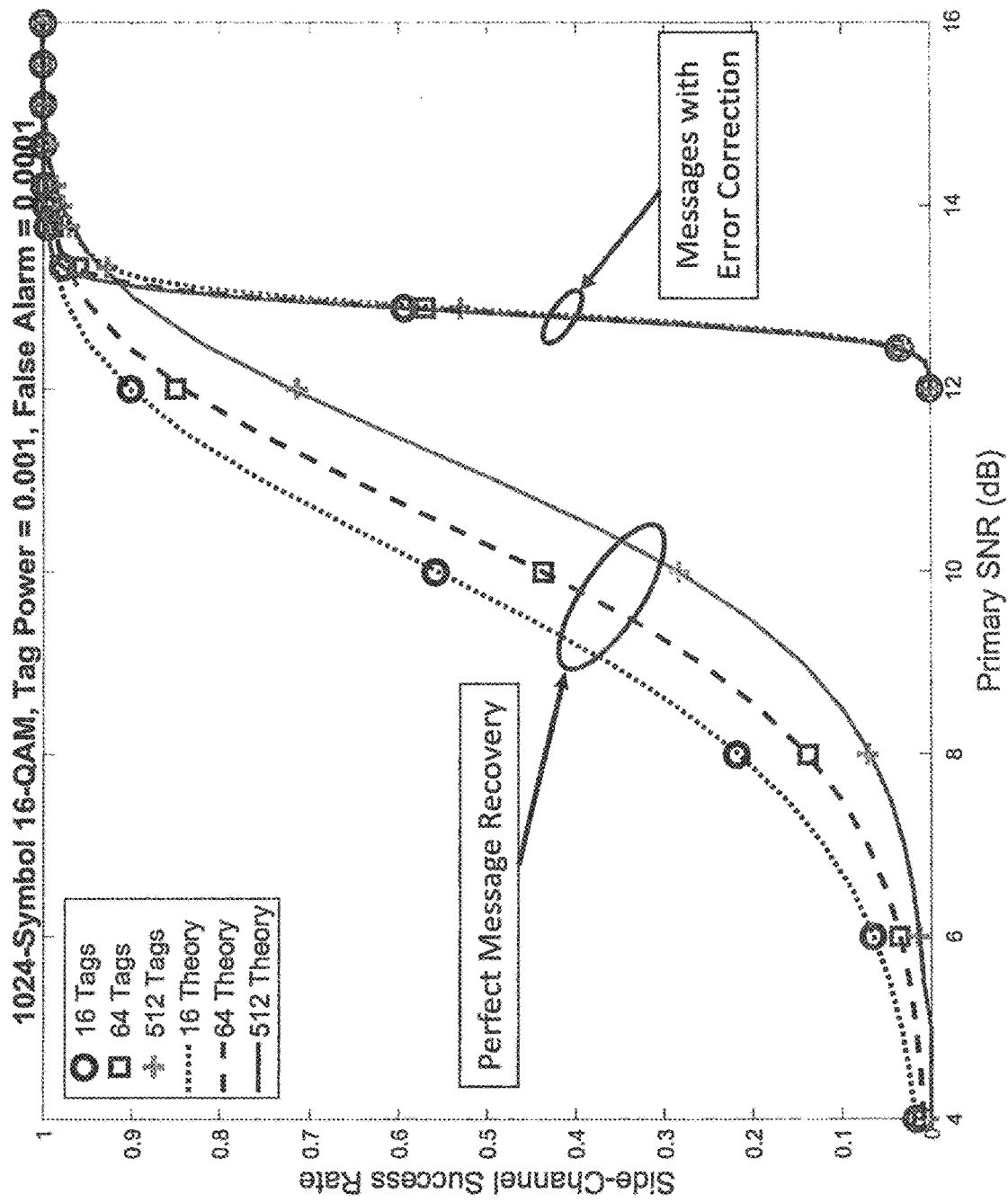
FIG. 3 is a graphical diagram representing side channel performance messages with and without error correction.

We now take message errors into account and simulate an error-correcting code in which messages with less than 10 bit errors per 512 bit block are perfectly recovered. The difference in performance is due to the receiver's inaccurate recreation of the codebook when incorrect messages are obtained. Due to the nature of hash functions, even a single bit error in the primary message will cause the receiver to construct a completely random and independent codebook. The authentication and side-channel performance with message errors is shown in FIG. 3. The performance changes as expected and all three cases with varying $N_k$ are clustered closer together due to complete codebook reconstruction failure when the primary message error correction code fails, which in this case requires 10 or more bit errors.

Figure 4:
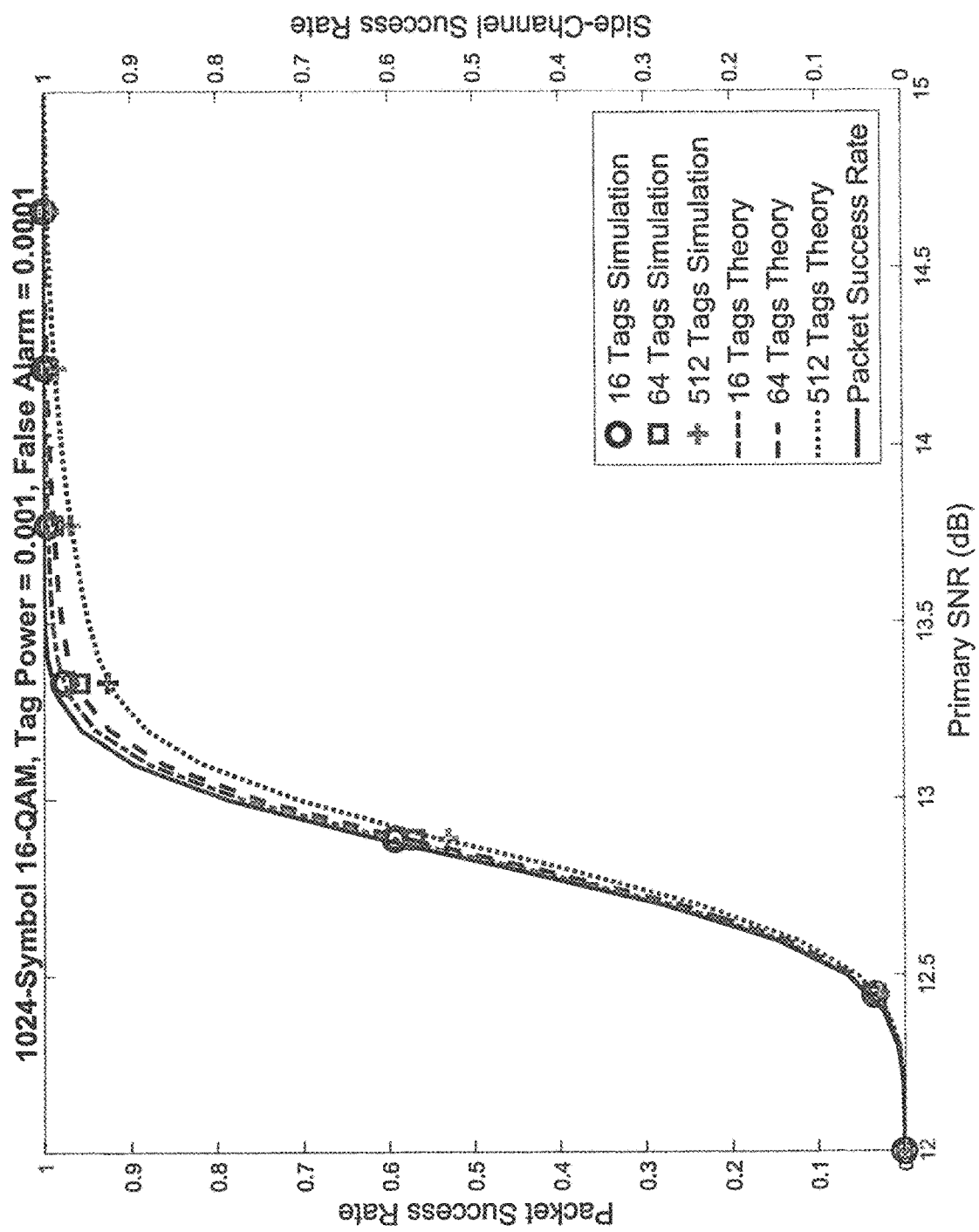
FIG. 4 is a graphical diagram representing side channel performance that follows the packet success rate.

Packet success rate (PSR), or the percentage of correctly received primary messages, is the limiting factor. The simulation parameters remain unchanged from the plots in FIG. 2 in which packets at the SNR required to perfectly recover the primary message are authenticated with high probability. Thus, the performance mirrors the PSR. FIG. 4 illustrates how the PSR upper bounds the performance in the case of message error correction. The side-channel success rate does not exceed the PSR for any $N_k$.

Referring to FIG. 3 we note side-channel performance with and without primary message error correction decoding Secrecy Analysis We now turn our attention to the secrecy of the system. We use the information-theoretic concept of equivocation to quantify the secrecy of the legitimate parties' key. We assume that the adversary does not know the shared key but has unlimited computational power and complete knowledge of the entire fingerprint embedding authentication process.

Equivocation, or conditional entropy, is an information-theoretic metric that quantifies the amount of information one variable reveals about another [4]. The way in which equivocation of the secret key decreases as the adversary observes legitimate transmissions is considered. Entropy denoted H(X), is the amount of information contained in a realization of a random variable. Given the channel between the transmitted and adversary, the adversary's key equivocation can be calculated. This allows them to track the risk of key compromise and to refresh their key accordingly. For example, replacing² k with another random K bit sequence will reset the adversary's key equivocation to κ.

The adversary's key equivocation given an observation Z is $$H(k \mid y, \theta) = \sum_{s \in S, t \in \mathcal{T}} p(s, t) H(k \mid s, t). \quad \text{(eq. 25)}$$

The key equivocation is upper bounded by the entropy of the key, κ bits in this case, and can decrease with more observations. Conceptually, key equivocation arises when more than one key can produce the observed message/tag pairs. If the message and tag pair are observed without noise, nonzero key equivocation is unlikely to occur due to collision resistance in hash functions. The situation, however, is made more complicated when the tag is observed with noise (Section 4.1) and when multiple keys are used resulting in enhanced security for the legitimate parties (Section 4.2). Now referring to FIG. 4. the side-channel performance follows the packet success rate of the primary channel because of error-free primary messages are required for the receiver to accurately reconstruct the codebook.

4.1 Single Key Scheme

We assume that the adversary is able to recover the message s without error from Z. The transmitter transmits the associated tag at low power so that the adversary makes the noisy estimate t̂, just as the receiver does (see (7)). Suppose that the transmitter uses the same key and transmits n authenticated messages. The adversary then obtains the pairs $(s^i, t^{\hat{i}})$ for i=1, ..., N.

The adversary can create a super-tag estimate through concatenation:

$$\hat{t} = \hat{t}^1 | \hat{t}^2 | \ldots | \hat{t}^N. \quad \text{(26)}$$

2A challenge is communicating the new keys to both parties while keeping it hidden from the adversary. Using the side-channel for key updates may be an interesting topic of future research.

With no penalty for computational complexity, they can create a noiseless super-tag for the observed messages $$t_j = t^1 | t^2 | \ldots | t^N = g(s^1, k_j) | g(s^2, k_j) | \ldots | g(s^N, k_j). \quad \text{(27)}$$

for each possible key in $k_j \in K$. The adversary can determine the set of most likely keys by comparing t with each $t_j$ using a metric such as Hamming distance.

Using this approach, the adversary's single key equivocation after N observations can be approximated as [5], $$H(k \mid Y^n; \theta) \cong \quad \text{(eq. 28)}$$

$$\frac{|\mathcal{K}|}{|\mathcal{T}|^N} \sum_{i=0}^{N \log_2 |\mathcal{T}|} \binom{N \log_2 |\mathcal{T}|}{i} H\left( \frac{|\mathcal{T}|^N}{|\mathcal{K}|} p_e^i (1-p_e)^{N \log_2 |\mathcal{T}| - i} \right).$$

where $p_e$ is the iid tag bit error probability and $\theta = \{|\mathcal{T}|, |\mathcal{K}|, p_e\}$ are system parameters. Note that $p_e$ is generally high for the adversary, because by design the tag is inserted by the transmitter with low power resulting in a noisy tag estimate for the adversary. $H(k|Y^n; \theta)$ decreases linearly with N since each observation contributes the same expected amount of information.

The adversary's impersonation attack success probability is lower bounded by $P_1 \geq \min\{\alpha, 2^{-H(k|Y^n;\theta)}\}$ since they can always randomly select a key from her search space. If the legitimate users can perform a key update whenever $2^{-H(k|Y^n;\theta)}$ exceeds α, then the adversary will theoretically not gain sufficient information to impersonate at a probability higher than using a randomly chosen tag.

4.2 Multiple Key Scheme

We now consider the case where multiple keys are used for the side-channel communications as described in Section 2.3. The adversary can impersonate the legitimate transmitter upon obtaining any key from the valid set of keys Kvalid, defined in Section 2.1. However, the transmitter's use of multiple keys complicates the adversary's key inference. Previously in Section 4.1, the adversary always attributed their observations to the same, albeit unknown, key. With multiple keys being possible, the adversary must be able to attribute each observation to the correct key.

Figure 5:
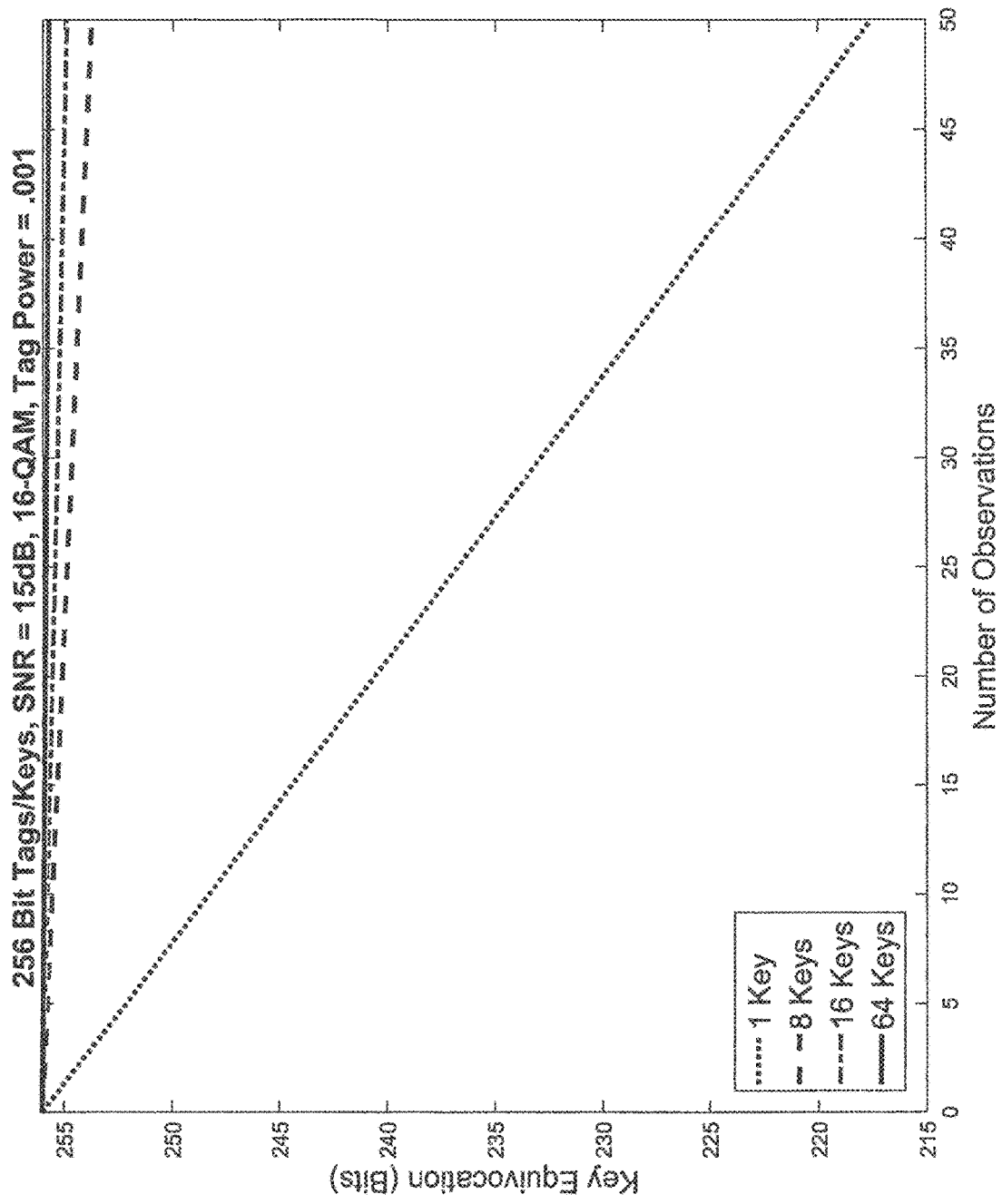
FIG. 5 is a graphical diagram representing the key equivocation decreasing linearly with each of the adversary's observations.

In the following, we make a worst case assumption that the adversary can always attribute each observation to the valid key. Assuming that the transmitter chooses the keys uniformly at random, the adversary waits $N_k$ observations on average to infer knowledge about any particular key. Thus, the key equivocation of one key from the set of $N_k$ keys is, $$H(k \mid Y^n; \theta) \cong \quad \text{(eq. 29)}$$

$$\frac{|\mathcal{K}|}{|\mathcal{T}|^{\frac{N}{N_k}}} \sum_{i=0}^{\frac{N}{N_k} \log_2 |\mathcal{T}|} \binom{\frac{N}{N_k} \log_2 |\mathcal{T}|}{i} H\left( \frac{|\mathcal{T}|^{\frac{N}{N_k}}}{|\mathcal{K}|} p_e^i (1-p_e)^{\frac{N}{N_k} \log_2 |\mathcal{T}| - i} \right),$$

which can be further simplified when each tag's bit error probability is iid, since the amount of information contributed by each bit of the tag would be the same. The simplification results in the following key equivocation formula, $$H(k \mid Y^n; \theta) \cong \log_2 |\mathcal{K}| - \frac{n}{N_k} \log_2 |\mathcal{T}| (1 - \mathcal{H}(p_e)), \quad \text{(eq. 30)}$$

where $H(p) = -p \log 2 (p) - (1-p) \log 2 (1-p)$ is the binary entropy function. FIG. 5 shows that increasing $N_k$ requires the adversary to make more observations to infer the same amount of information about a key in $^{valid}$. Since the adversary gathers information about independent key partitions, it will take more observations for $2^{-H(k+Y^n;\theta)}$ to exceed α for one of the keys.

The same increase in key equivocation depicted in FIG. 5 can be achieved with a single key whose length is equal to the combined length of all $N_k$ keys. Each observed tag contributes the same amount of information about the group of keys. The main secrecy benefits of the multi-key scheme arise from computational security since the adversary's message-key attribution problem adds combinatorial complexity. Equation (30) gives a worst case scenario for the legitimate users when the adversary uses the above scheme assuming perfect key attribution. It is important to note that the main motivation for the multi-key scheme is to add a covert side-channel rather than add additional security, although it also adds computational complexity for the adversary. Referring to FIG. 5 we see the key equivocation decreases linearly with each of the adversary's observations. The equivocation for keys from larger key sets decreases much more slowly because it takes more observations for any specific key/tag to be repeated. The overall information being leaked is equivalent however.

4.3 Linear Codebook Scheme

We now analyze the security of the secret linear codebook construction. For codebooks of equal size, the linear scheme requires fewer partitions of the master key k compared to the partition scheme. In this case, the adversary must obtain more secret bits in order to launch a successful impersonation attack since each key in Kvalid will be larger. If the linear combinations were performed at the key level rather than at the tag level, the adversary would be able to generate a valid tag by determining the linear combination that produced a tag and not the specific keys. Linearly combining at the tag level ensures that they must derive the exact keys used to produce an observed tag. The adversary's key inference complexity is greatly increased since they must attribute each observed tag to $2^{N_k}$ possible key combinations instead of just $N_k$.

| Scheme | Secondary Message Rate | Key Usage Rate | Attack Resence |
|---|---|---|---|
| Single Key ($N_K = 1$) | 0 | κ | κ |
| Partitioned ($N_K \geq 2$) | $\log_2 (N_K)$ | $\kappa/N_K$ | $\kappa/N_K$ |
| Linear ($N_K \geq 2$) | $\log_2 (2^{N_k} - 1)$ | κ/2 (Avg.) | $\kappa/N_K$ |
|  | $\log_2 (N_K) - 1$ | κ/2 (Avg.) | $\kappa/\log_2 (N_K)$ |

Table 1: Secrecy and Rate Trade-Offs for 3 Key Usage Schemes (Schemes for using κ bits of secret key. Resilience is the amount of secret key that can be leaked before impersonation attacks are guaranteed to succeed. Detailed explanation of trade-offs presented in Section 4.4.)

4.4 Security and Side-Channel Rate Trade-Offs

TABLE 1

Secrecy and Rate Trade-Offs For 3 Key Usage Schemes

| Scheme | Secondary Message Rate | Key Usage Rate | Attack Resilience |
|---|---|---|---|
| Single Key ($N_K = 1$) | 0 | κ | κ |
| Partitioned ($N_K \geq 2$) | $\log_2 (N_K)$ | $\kappa/N_K$ | $\kappa/N_K$ |
| Linear ($N_K \geq 2$) | $\log_2 (2^{N_k} - 1)$ | κ/2 (Avg.) | $\kappa/N_K$ |
|  | $\log_2 (N_K) - 1$ | κ/2 (Avg.) | $\kappa/\log_2 (N_K)$ |

Figure 6:
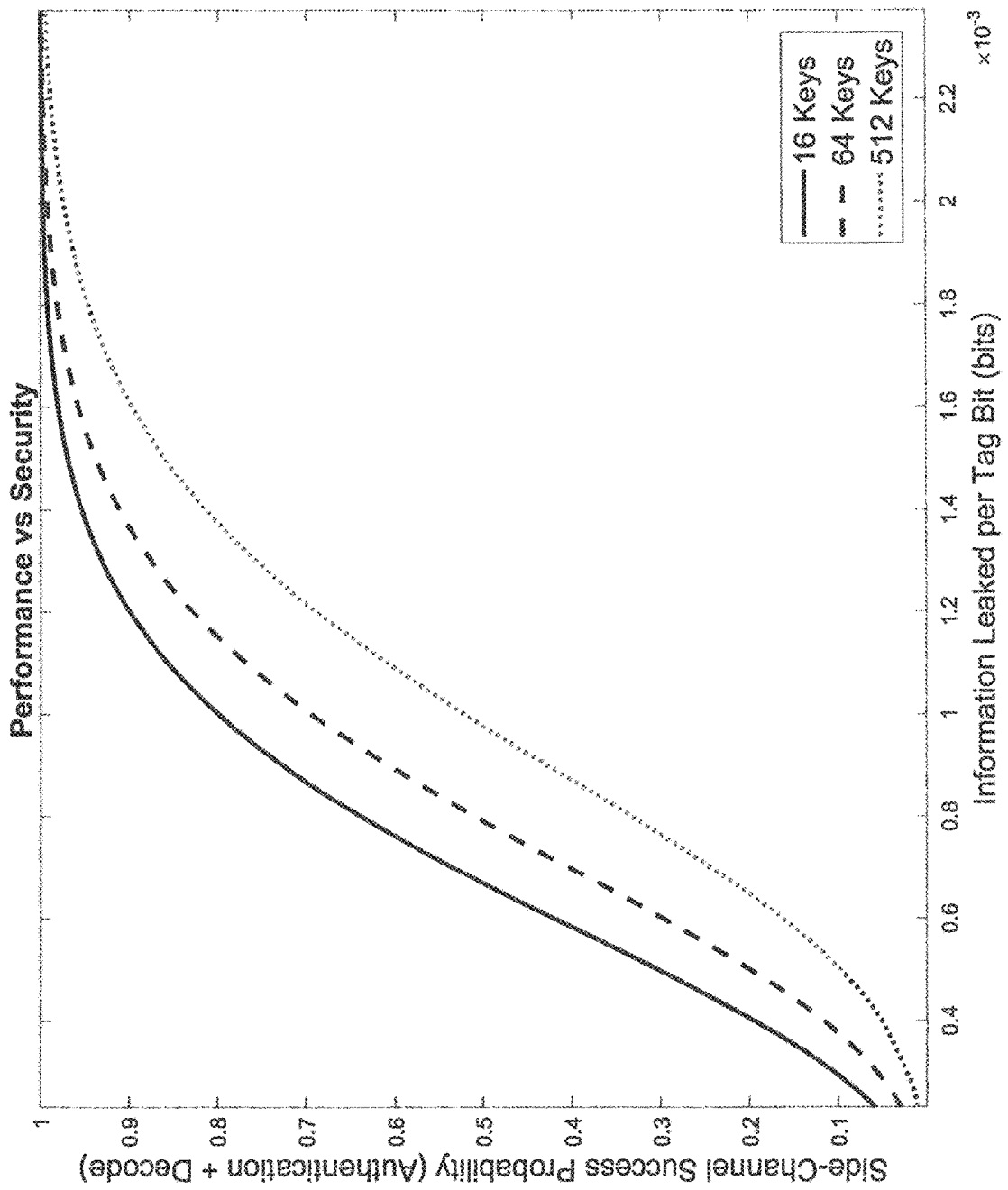
FIG. 6 is a graphical diagram representing performance vs security over side-channel success probability.

As the transmitter increases their tag power, they simultaneously increase the receiver's authentication and side-channel decoding success probability while undesirably leaking more key information to the adversary. This trade-off between side-channel success and the amount of information leakage is depicted in FIG. 6 which plots (23) versus (29) over an SNR range of 4 to 14 dB for varying $N_k$. We again use L=1024, 16QAM message and tag modulation, $p^2=0.001$, and $\alpha=10^{-4}$. Since increasing the side-channel rate requires a higher tag power, more information is revealed through the tag for a given success probability. The method of generating authentication tags also impacts the trade-offs between side-channel rate and impersonation resistance. Table 1 details the major security and communication rate trade-offs of three explicit constructions using the fingerprint embedding framework.

For $N_k=1$, an adversary must obtain all K bits to guarantee success in an impersonation attack. This provides the legitimate users with the best protection, but restricts communication and requires the use of all of their secret information for each transmission. For $N_k \geq 2$ without the linear coding, the adversary requires less secret information to attack, but now the transmitter can communicate $\log 2\ N_k$ bits of information using only $\kappa/N_k$ bits of the total secret key for each transmission. For $N_k \geq 2$ with the linear coding, the adversary requires the same amount of information, but now $\log 2\ 2^{N_k}-1$ bits can be communicated using on average κ/2 bits of the secret, assuming the secondary messages are chosen uniformly and randomly. This comes at the cost of degraded side-channel performance since the codebook size increases, although for low rate side-channel communications this impact may be negligible. Alternatively, the transmitter can achieve the same side-channel rate by constructing a linear code using fewer, but larger, partitions of the master key and thus obtaining better protection against impersonation attacks since the adversary will require more observations. The linear codebook scheme, however, uses, on average, more bits of the secret key k for each transmission than the partitioned codebook scheme.

5 Privacy Analysis

Referring to FIG. 6 we note that more information is revealed about the key as the receiver's performance improves by increasing the side-channel SNR, i.e, allocating proportionality more power to tag. Now consider the scenario in which the adversary must make a decision whether a captured trans-mission from the transmitter contains an authenticating tag or not. By controlling the tag power, the legitimate users can force the adversary into a regime in which they cannot reliably detect the embedded tags which further confounds their ability to infer key information. The existence of an "SNR wall" can aid the legitimate users in concealing their superimposed authentication tags [6]. In this section, we consider the impact of an SNR wall on authentication, relate our framework to the assumptions of [6], and consider different operating regimes in the fingerprint embedding scheme.

5.1 Limits of a Radiometer Detector

We assume the adversary knows the complete authentication scheme, including the tag power, but not the secret key. Since only one tag is sent with each transmission, the adversary's detection problem will be the same for both the single and multiple key cases. In either scenario, the transmitter wishes to determine the tag power, $p_t$, and length, L, such that the receiver authenticates with high probability while the adversary detects the presence of the tag with arbitrarily low probability. The receiver and the adversary both face a detection problem. While the adversary is only differentiating between signal-plus-noise and noise (where we assume the adversary knows the digital constellations employed), the receiver must decide between $N_k+1$ hypotheses. However, since the receiver has knowledge of the expected secret codebook, they can gain an advantage over the adversary.

The advantage can be seen when considering a phenomenon, introduced in [6], known as an SNR wall. Detectors operating in an SNR regime below the SNR wall threshold will not be able to robustly detect the signal. This arises when a radiometer detector is used and there is uncertainty in the observed noise power. In this case, robustness is defined as the ability to achieve desired error performance for all possible noise powers in an uncertainty region.

If the adversary's noise uncertainty lies in a range, $$\sigma_e^2 \in \left[\frac{1}{\rho}\sigma^2, \rho\sigma^2\right]$$

where $\sigma^2$ is the nominal noise power, and they use a radiometer for detection, then an SNR wall exists and is given by $$SNR_{wall} = \frac{\rho^2 - 1}{\rho}. \quad \text{(eq. 31)}$$

Notice that the location of the wall is independent of the number of samples that the adversary observes. Further, the SNR wall is not applicable to the receiver, who uses a matched filter rather than a radiometer. If they know $\rho$, the transmitter can choose a tag power allocation $p^2$ to force the adversary's observations to be below the SNR wall using (31) assuming they also know the adversary's channel, or has knowledge of their channel statistics (see Section 5.2). Then, since sample length is independent of the wall, they can increase the tag length until the total tag energy is high enough to produce desired results in the receiver's matched filter test.

Figure 7:
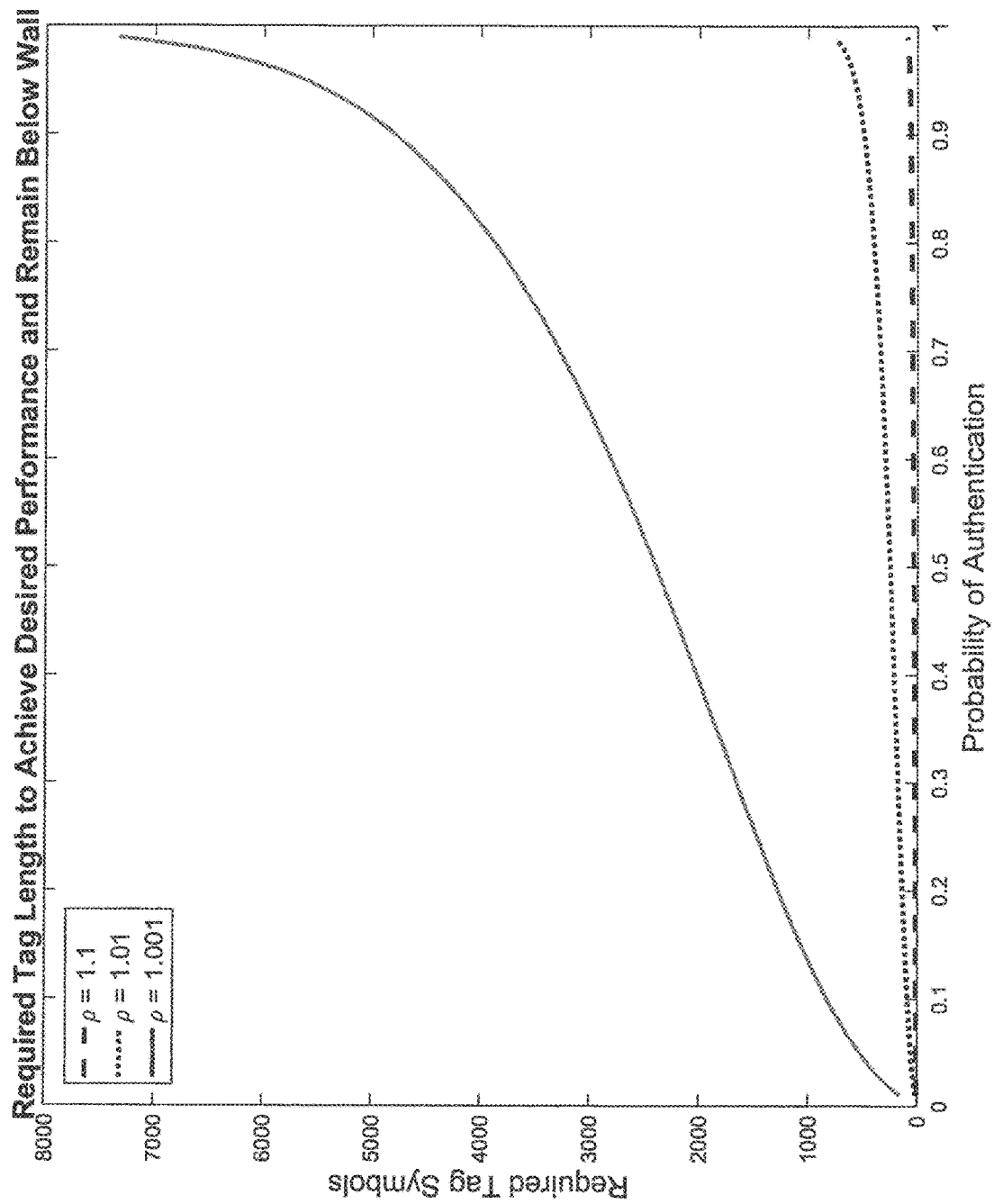
FIG. 7 is a graphical diagram representing required tag length to achieve desired performance and remain below wall over required tag systems.

FIG. 7 depicts an example of the number of tag symbols required to achieve desired authentication performance in the single key scheme while forcing The adversary to operate below the SNR wall for different side-channel success probabilities. The transmitter sets their tag power using (31), so that $$p_t^2 \leq \frac{\rho^2 - 1}{\rho} \sigma_e^2. \quad \text{(eq. 32)}$$

Then, for a given desired side-channel success probability of $P_A$ and false alarm, $\alpha$, the transmitter chooses a tag length, L, by solving [7, Equation 14] for L with the SNR set to the appropriate $SNR_{wall}$ to get $$L = \left[ \frac{\Phi^{-1}(1-\alpha)\sqrt{\frac{1}{2} + \frac{1}{2}SNR_{wall}^{-1}} -}{\Phi^{-1}(1-P_A)\sqrt{\frac{1}{2}SNR_{wall}^{-1}}} \right]^2, \quad \text{(eq. 33)}$$

for the single key case and by solving (23) for L in the multi-key case. The required tag length increases as PA increases and as the adversary's uncertainty, $\rho$, decreases.

5.2 Estimating the Adversary's SNR Wall

The theoretical analysis raises the question of how to obtain p, the parameter that characterizes the adversary's noise uncertainty, so that the transmitter can set their tag power and length accordingly. Without knowing p, the transmitter will be unable to compute the adversary's SNR wall and the required tag power to achieve desired performance. It is possible for the uncertainty to be lower bounded by taking note of the measurement inaccuracies in estimating the thermal noise variance in a receiver and propagation constants to obtain a lower bound for the adversary's SNR wall [8]. Using the bound, the transmitter can obtain a conservative estimate of the uncertainty and can design their system accordingly.

Suppose that the transmitter wishes to estimate the adversary's SNR wall under a given prior on the fading coefficient of their channel. In this case, we consider a fading environment where the adversary's observation (6) now takes on the form $$Z = Hx + W_e. \quad \text{(eq. 34)}$$

For simplicity, we will assume a Rayleigh block-independent fading model in which each message will experience an independent zero-mean Gaussian distributed fade, h, with variance $\sigma^2$. Now, the average SNR of the adversary's received tag will be $\bar{\gamma}_h = p^2\sigma^2/\sigma^2$. Therefore, the SNR for each message will be exponentially distributed as $$P\gamma_h(x) = \left(\frac{1}{\bar{\gamma}_h}\right)e^{-x/\bar{\gamma}_h}. \quad \text{(eq. 35)}$$

Given the distribution and its parameter $\bar{\gamma}_h$, the tag power required to force the adversary's SNR to be below the SNR wall with a desired probability, $\lambda$, is $$p_t^2 \leq -\frac{\sigma_e^2}{\sigma_h^2 \ln(1-\lambda)}\left(\frac{\rho^2 - 1}{\rho}\right). \quad \text{(eq. 36)}$$

5.3 Optimal Detector with No Noise Uncertainty

The radiometer detector and noise uncertainty provide an achievable operating point to limit the adversary's detection capabilities. When the restrictions are removed, however, and the adversary has the ability to design an optimal test with no noise uncertainty, theoretical guarantees of undetectable authentication are difficult to attain. An approach in [9] uses the total variation distance and Kullback-Leibler divergence to lower bound the sum of error probabilities for the optimal detector and states that covert communication with low probability of detection is possible. The rate of communications, however, approaches 0 as the message length tends towards infinity. In finite cases, it is stated that O(n) bits can be sent in n channel uses while limiting the sum of the type I and II errors of the adversary's detector to $\alpha + \beta \geq 1 - E$ for any arbitrary E where $\alpha$ and $\beta$ are the type I and II errors of the detector, respectively.

Using this analysis, the required tag power to achieve an E that satisfies $\alpha + \beta \geq 1 - E$ is $$p_t^2 \leq 2\sigma_e^2 \sqrt{\frac{2}{n}} \epsilon. \quad \text{(eq. 37)}$$

Unlike with SNR walls, the result relies on the length of the transmitted message and, in practical scenarios we have considered, generally produces a tag power that is too low for successful authentication.

Finally, this invention, an extension of the fingerprint embedding authentication scheme was presented and analyzed. By partitioning a shared key, two legitimate parties create a secret codebook that is used to both authenticate their communications and communicate additional side-channel information at minimal cost. The secret codebook construction schemes, most notably our novel secret linear code, allow the legitimate users to control the trade-offs in side-channel rate and secrecy. In particular, we applied the key equivocation metric to measure key information leakage to an eavesdropper over time, and we also showed how an SNR wall can be utilized to attain a degree of stealth when noise uncertainty is present in the eavesdroppers detector. The described trade-offs and analysis of authentication performance, side-channel rate, secrecy, and privacy provide users with the ability to design their system according to their system specifications and needs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for wireless communication using a service side-channel signaling and authentication at the physical level the method comprising the steps of:
    creating at least one transmitting node and one receiving node within a wireless communication channel;
    choosing primary message and a secondary message to be sent by a transmitter;
    generating a valid transmission tag to be sent by said transmitter;
    superimposing the valid transmission tag by said transmitter;
    creating a set of secret codebooks by said transmitter;
    forming a side-channel and applying key equivocation metric to measure key information leakage to an eves dropper by said transmitter;
    transmitting said primary message and said secondary message by said transmitter;
    receiving said primary and said secondary messages by a receiver;
    detecting fingerprint by said receiver;
    estimating data by said receiver;
    combining a key set with the estimated data by said receiver;
    sending data and key set to a matrix to generate a secret codebook by said receiver;
    searching for valid tags by said receiver;
    authenticating and recovering side information by said receiver.

2. The method of claim 1, wherein said secret codebooks are created from a random generator matrix made up of the valid tags of a standard codebook.

3. The method of claim 1, wherein generating valid transmission tags further comprises forming said valid transmission tags from originally generated data, generated side data and a key set combined together in a valid transmission tag generating matrix.

4. The method of claim 3, wherein superimposing said valid transmission tags further comprises using the generated transmission tags and the originally generated data to form a message wherein said valid transmission tags are superimposed.

5. The method of claim 1, wherein the step of detecting fingerprint further includes observing a threshold for changes.

6. The method of claim 5, wherein the step of observing a threshold further includes calculating appropriate threshold limits to prevent false alarms.

7. The method of claim 1, where the step of receiving further includes reconstructing a valid codebook from the obtained information in the side-channel message and a shared key.

8. The method of claim 1, wherein the step of authentication further comprises detecting a valid tag through observation.

* * * * *